Figure 1:
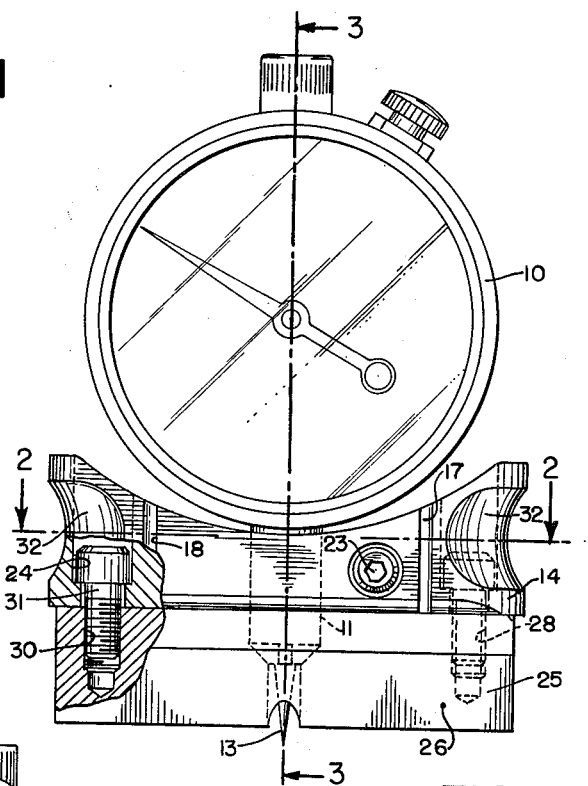

July 20, 1965  D. H. ALDEBORGH  3,195,237
DIAL DEPTH GAGE
Filed Oct. 10, 1962

INVENTOR.
DAVID H. ALDEBORGH
BY Darby & Darby
ATTORNEYS

United States Patent Office 3,195,237
Patented July 20, 1965

3,195,237
DIAL DEPTH GAGE
David H. Aldeborgh, Poughkeepsie, N.Y., assignor to Standard Gage Company, Inc., Poughkeepsie, N.Y., a corporation of New York
Filed Oct. 10, 1962, Ser. No. 229,651
4 Claims. (Cl. 33—172)

The present invention relates to depth gages and particularly to a depth gage which utilizes a dial indicator as the measuring element.

Such dial depth gages are well known in the art and generally comprise a block in which the stem of a dial indicator is clamped, the measuring plunger extending through the block and being positioned to determine the depth of a depression relative to the finished lower surface of the block. In some instances the block is flat whereas in other instances the block is tapered forming a knife edge and the contact point used on the dial indicator is a needle. When the knife edge arrangement is utilized it is essential to accuracy of reading that the indicator needle point be in exact alignment with the knife edge since if this is not the case any tipping of the knife edge as the reading is taken will affect the accuracy of the reading.

The condition mentioned, although more frequent with the knife edge arrangement, may also occur if the measurement is being made with respect to a surface which is not entirely flat.

It is extremely difficult to assure that the measuring plunger or needle point be in exact alignment with the knife edge when the knife edge reference and the indicator clamping means are integral since even minute variations in the indicator stem or in the aperture forming the clamping means will affect the position of the contact point relative to the knife edge.

By my invention this disadvantage of present instruments is eliminated, the reference and clamping means being separate and the reference being adjustable relative to the clamping means. Furthermore by using separate clamping means and reference elements it is possible to interchange different sizes and types of references at a much lower cost than is the case when clamping means and reference is integral.

It is therefore an object of the invention to provide a depth gage having the reference element adjustably mounted with respect to the dial indicator clamping element whereby the center of the gaging contact point may be placed into exact alignment with the center line of the reference element.

It is another object of the invention to provide such a structure wherein the clamping means is readily manufactured thereby reducing the cost since the only portion which needs to be accurately dimensioned, ground and lapped, is the reference element itself, whereas in the past the entire block including the clamping means had to be very accurately formed in order to assure that the reference element would be thus accurately formed.

It is a further object of the invention to reduce the cost of depth gages by making it possible to utilize a single indicator clamping element with a plurality of types and sizes of reference elements or bases.

Figure 2:
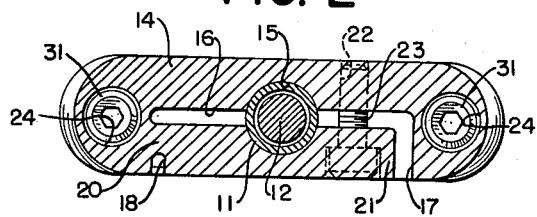
Figure 3:
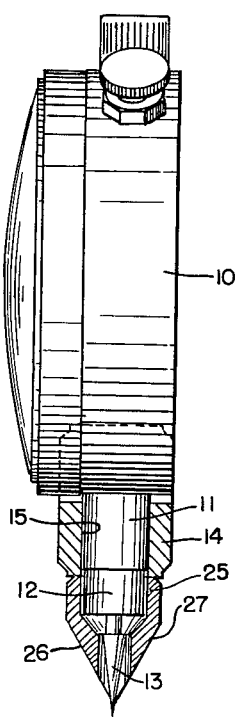

Other objects and features of the invention will be apparent when the following description is considered in connection with the annexed drawings, in which, FIGURE 1 is a front elevational view of a dial indicator depth gage in accordance with my invention;

FIGURE 2 is a horizontal cross-sectional view of the gage structure of FIGURE 1, the view being taken on the plane of the line 2—2 of FIGURE 1; and FIGURE 3 is a vertical cross-sectional view of the clamping and reference members of FIGURE 1, the view being taken on the plane of the line 3—3 of FIGURE 1 and showing the dial indicator in side elevation.

Referring now to the drawings, there is shown in FIGURE 1 a depth gage of the knife edge reference type having the usual dial indicator mounted thereon.

Dial indicator 10 is provided with the usual stem 11 and measuring plunger 12 (FIG. 2) terminating in the contact point 13 (FIGS. 1 and 3) which in this instance is of needle form. The dial indicator is fixed in position relative to the depth gage by means of the clamping member 14 which member has an aperture 15 located generally centrally thereof as well as the slots 16 and 17 which intersect and form an L. In addition, a slot 18 is formed in the side wall of the clamping member or block 14 thereby lessening the cross-sectional area at the point 20 and making it possible to utilize the portion 21 as a clamping element.

In practice the piece 14 is a casting having a slot 16 therein together with the two vertically disposed slots 18 and 17 which, as cast, is identical to 18. The material is subsequently cut away extending the slot 17 to a point of intersection with the slot 16 as shown in FIGURE 2 and providing for a slight freedom of movement of portion 21 relative to the remainder of the block 14 to provide the clamping action.

The clamping block 14 is also provided with an aperture 22 extending therethrough from front to rear, this aperture being enlarged at the forward edge and being threaded throughout the portion which extends rearwardly from slot 16. Thus a screw 23 threaded into the portion 22 will have its head against the shoulder formed by the juncture of the enlarged opening with the smaller opening and will serve to move the member 22 relative to the main portion of block 14 thereby clamping the gage stem 15 in a desired position.

In addition to the openings already mentioned, the block 14 is provided with a vertical opening 24 adjacent each end thereof, these openings extending completely through the block but being of lesser diameter at the lower end, and being located substantially on the longitudinal center line of the block.

The reference member 25 is shown as a knife edge which is ground flat and lapped on the faces 26 and 27 and which is also ground flat on its upper surface. The block 14 is ground flat on its lower surface so that these two members fit accurately against each other assuring that the center line of the knife edge formed by the two faces 26 and 27 is substantially in alignment with the center line of the clamping block 14.

The reference member 25 is drilled and tapped adjacent its ends as shown at 28 and 30, these tapped openings being also on the center line of the reference member 25.

Shouldered openings 24 in the clamping block 14 are of such size as to give both the head and shank of a screw 31 which extends through the opening and is threaded into the tapped holes 28 in the reference member 25 sufficient clearance so that the reference can be moved relative to the clamping block in order to align the center line of the needle point 13 with the knife edge.

As will be obvious the amount of adjustment is extremely small, but it is important in order that the needle be exactly aligned with the knife edge to prevent inaccuracy of readings particularly when the gaging structure is tilted as the reading is taken, but at the same time sufficient to assure the alignment of the knife edge and needle point.

It will be noted that the block 14 is provided with shaped portions 32 at the ends thereof, these portions being provided in order to facilitate handling of the instrument, the portions 32 forming gripping members by which the gage can readily be held during use.

While I have described a preferred embodiment of my invention it will be understood that the separate clamping block and reference members do not have the exact form shown, other clamping means being entirely within the purview of this invention and that it is only essential that the reference member be adjustable with respect to the indicator clamping block so that the center of the gage contact point may be brought into exact alignment with the center line of the reference member and especially with the knife edge when the reference member is of that type. I wish therefore to be limited not by the foregoing description but, on the contrary, solely by the claims granted to me.

What is claimed is:

1. A dial indicator depth gage comprising, in combination, a reference member having a knife edge lower surface and a finished planar upper surface, an indicator clamping block adapted to be clamped to the measuring plunger housing stem of a dial indicator with the stem extending through said block and being substantially perpendicular to a planar lower surface of said block, an aperture in said reference member for receiving the housing stem, measuring plunger and needle point measuring contact in which the measuring plunger terminates, said aperture being larger than the measuring plunger and contact point, and means for adjustably mounting said reference member on said clamping block to assure that the center of said contact point is in alignment with said knife edge.

2. A dial indicator depth gage as claimed in claim 1 wherein said mounting means for said reference member comprises screws extending through clearance holes in said clamping block and threaded into corresponding tapped holes in said reference member.

3. A dial indicator depth gage as claimed in claim 1 wherein said clamping block comprises a single piece of material of generally rectangular cross-section having an opening therethrough at substantially the center thereof, said opening being intersected by a longitudinally extending slot on the center line of said piece, said slot extending transversely to the outer edge at one end, said piece having a second slot extending inwardly from said outer edge in alignment with the opposite end of said first slot thereby forming a movable portion adapted to clamp an indicator stem in said opening.

4. A dial indicator depth gage as claimed in claim 3 wherein a screw is inserted through an opening in said movable portion and into an aligned tapped hole in said block whereby said movable member may clamp an indicator stem.

References Cited by the Examiner

UNITED STATES PATENTS

| 877,934 | 2/08 | Lea | 33—173 |
| 1,160,630 | 11/15 | MacKinnon | 33—172 |
| 2,678,502 | 5/54 | Pistoles | 33—172 |
| 3,093,906 | 6/63 | Cohara | 33—75 |

FOREIGN PATENTS

| 121,769 | 5/48 | Sweden. |

OTHER REFERENCES

Standard Tial and Limit Gages, Standard Gages Company, Catalogue No. 6A, 1934, Poughkeepsie, New York, page 28.

ISAAC LISANN, *Primary Examiner.*